United States Patent Office 3,689,467
Patented Sept. 5, 1972

3,689,467
BENZOTHIAZOLE SULFENAMIDES
Kamel Boustany and John J. D'Amico, Akron, Ohio,
assignors to Monsanto Company, St. Louis, Mo.
No Drawing. Filed Jan. 28, 1971, Ser. No. 110,658
Int. Cl. C08c 11/62; C08f 27/06
U.S. Cl. 260—79.5 B                      11 Claims

ABSTRACT OF THE DISCLOSURE

Compounds of the formula

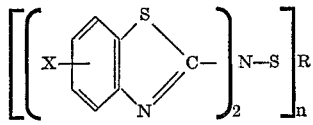

wherein X is hydrogen, alkyl alkoxy, nitro, halo, or hydroxy and $n$ is one or two; when $n$ is one R is alkyl, cycloalkyl, aralkyl or aryl; when $n$ is two R is alkylene which compounds are delayed action cure activators for rubber.

BACKGROUND OF THE INVENTION

This invention relates to new compounds useful as activators for the vulcanization of rubber.

Activators, sometimes called secondary accelerators, are used by manufacturers of vulcanized products to improve the vulcanization process by reducing the time required to cure a vulcanizable composition. Commonly used activators are diphenylguanidine and thiuram sulfides, however, their use adversely affects the processing safety of the stocks and as a consequence, prevulcanization inhibitors may have to be used to avoid premature vulcanization of certain stocks. The compounds of this invention possess a valuable combination of properties in that they activate the vulcanization cure rate and also inhibit premature vulcanization. These and other advantages of the invention will become apparent as the description of the invention proceeds.

SUMMARY OF THE INVENTION

The compounds of this invention are characterized by the formula

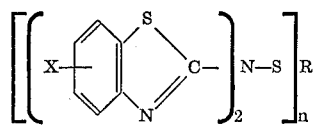

wherein X is hydrogen, lower alkyl, lower alkoxy, nitro, chloro, bromo, iodo, or hydroxy and $n$ is one or two; when $n$ is one R is alkyl, cycloalkyl, aralkyl or aryl; when $n$ is two R is alkylene. The alkyl radical may be primary, secondary or tertiary and the alkyl chains thereof may be branched or unbranched. Alkyl radicals of 1–20 carbon atoms are suitable with radicals of 1–10 carbon atoms being preferred. According to this invention lower alkyl means radicals of 1–5 carbon atoms. Cycloalkyl radicals of 5–12 carbon atoms are suitable with radicals of 5–8 carbon atoms being preferred. Aralkyl is a monovalent alkyl radical having a phenyl radical attached to a carbon atom of the alkyl chain. Aralkyl radicals of 7–10 carbon atoms are preferred. Aryl is a monovalent radical derived by removal of one hydrogen atom from an aromatic hydrocarbon. The aryl radical may be substituted in the aromatic nucleus by alkyl groups. Aryl radicals of 6–12 carbon atoms are suitable. Phenyl is the preferred aryl radical but radicals of the naphthalene series are suitable. Alkylene means a divalent alkyl radical wherein each valence is attached to an acyclic or cyclic aliphatic carbon atom. Alkylene radicals of 1–8 carbon atoms are preferred. The alkylene chain may be interrupted by a phenylene radical.

Examples of R are methyl, ethyl, propyl, isopropyl, butyl, isobutyl, sec-butyl, tert-butyl, amyl, hexyl, octyl, decyl, dodecyl, cetyl, eicosyl, cyclopentyl, cyclohexyl, cyclooctyl, cyclodecyl, cyclododecyl, benzyl, alpha-methyl benzyl, alpha,alpha-dimethyl benzyl, phenethyl, xylyl, phenyl, naphthyl, tolyl, 4-ethyl phenyl, ethyltolyl, propylphenyl, butylphenyl, hexylphenyl, methylene, dimethylene, trimethylene, 1-methyldimethylene, tetramethylene, pentamethylene, hexamethylene, heptamethylene, octamethylene, 1,4-dimethyltetramethylene, xylylene and cyclohexylene.

Examples of the compounds of the invention are:

N,N-di(4-methylbenzothiazolyl)cyclohexane-
  sulfenamide,
N,N-di(5-ethylbenzothiazolyl)alpha-toluene-
  sulfenamide,
N,N-di(4-chlorobenzothiazolyl)benzenesulfenamide,
N,N-di(5-bromobenzothiazolyl)isopropanesulfenamide,
N,N-di(6-ethoxybenzothiazolyl)-n-butanesulfenamide,
N,N-di(6-nitrobenzothiazolyl)-2-isobutanesulfenamide,
N,N-di(6-hydroxybenzothiazolyl)cyclohexane-
  sulfenamide,
N,N-di(2-benzothiazolyl)methanesulfenamide,
N,N-di(2-benzothiazolyl)ethanesulfenamide,
N,N-di(2-benzothiazolyl)-n-butanesulfenamide,
N,N-di(2-benzothiazolyl)octanesulfenamide,
N,N-di(2-benzothiazolyl)alpha-toluenesulfenamide,
N,N-di(2-benzothiazolyl)-p-toluenesulfenamide,
N,N-di(2-benzothiazolyl)naphthalenesulfenamide,
N,N-di(2-benzothiazolyl)cyclopentanesulfenamide,
N,N-di(2-benzothiazolyl)cyclododecanesulfenamide,
N,N-di(2-benzothiazolyl)-2-isobutanesulfenamide,
N,N-di(4-methyl-2-benzothiazolyl)benzenesulfenamide,
N,N-di(5-chloro-2-benzothiazolyl)propanesulfenamide,
1,2-bis[N,N-di(2-benzothiazolyl)aminothio]ethane,
1,4-bis[N,N-di(2-benzothiazolyl)aminothio]butane,
1,6-bis[N,N-di(2-benzothiazolyl)aminothio]hexane,
1,4-bis[N,N-di(2-benzothiazolyl)aminothio]cyclo-
  hexane and
bis[N,N-di(2-benzothiazolyl)aminothio]phenylene-
  dimethylene.

Compounds wherein $n$ is one are prepared by reacting a sulfenyl chloride with a 2,2'-iminobis(benzothiazole); substituting a bis sulfenyl chloride in the same reaction gives compounds wherein $n$ is two.

The compounds of this invention are excellent delayed action activators for the vulcanization of rubber. The addition of the new compounds to sulfur-vulcanizable compositions provides stocks which cure faster with greater processing safety. Both properties are advantageous to the rubber manufacturer since faster cure rates decrease the time an article remains in the vulcanization mold, hence increasing productivity; and greater processing safety eliminates discarding of stocks ruined by premature vulcanization.

The activators of the invention can be used in natural and synthetic rubbers and mixtures thereof. Any diene rubber having sufficient unsaturation to be sulfur vulcanizable is suitable. Examples of suitable synthetic rubbers are styrene-butadiene copolymer (SBR), isobutylene-isoprene copolymer (butyl), ethylene-propylene diene terpolymer (EPDM), butadiene-acrylonitrile copolymer (nitrile), polymers of chloroprene (neoprene) and synthetic polybutadiene, particularly cis-polyisoprene and cis-polybutadiene.

The invention is applicable to vulcanizable compositions containing vulcanization accelerators of various classes and accelerator mixtures. For example, rubber mixes containing the aromatic thiazole accelerators which include N-cyclohexyl-2-benzothiazolesulfenamide,
N,N-dialkyl-2-benzothiazolesulfenamide,
2-mercaptobenzothiazole,
N-tert-butyl-2-benzothiazolesulfenamide,
2-benzothiazolyl diethyldithiocarbamate,
2,2'-dithiobisbenzothiazole,
2-(morpholinothio)benzothiazole and 2-(morpholinodithio)benzothiazole may be used. Amine salts of mercaptobenzothiazole accelerators, for example, the t-butylamine salt, morpholine salt or 2,6-dimethyl morpholine salt of mercaptobenzothiazole may be used in the invention. Any of the thiazole accelerators may be used. The invention is applicable to stocks containing amine antidegradants. Rubber mixes containing antidegradants, for example, N-1,3-dimethylbutyl-N'-phenyl-p-phenylenediamine, N,N - bis(1,4 - dimethylpentyl) - p-phenylenediamine and other phenylenediamines, ketone, ether and hydroxy antidegradants and mixtures thereof, are substantially improved using the process of our invention. Mixtures of antidegradants, for example, a mixture of N - 1,3 - dimethylbutyl - N' - phenyl - p - phenylenediamine and N,N' - bis(1,4 - dimethylpentyl) - p-phenylenediamine, may be used with the activators of this invention.

For the purposes of this invention, sulfur-vulcanizing agent means elemental sulfur or sulfur-containing vulcanizing agent, for example, an amine disulfide or a polymeric polysulfide. The various types of sulfur-containing vulcanizing agents are known to those skilled in the art of rubber vulcanization.

The amount of activator required in the practice of this invention depends upon other components in the vulcanizable composition. Generally, after an amount effective to enhance the vulcanization rate is added, additional amounts do not materially affect the vulcanization parameters. The amount of delayed-action activator added is usually between 0.1 to 2.0 parts by weight, the preferred amount being between 0.2 to 0.5 part by weight.

DESCRIPTION OF PREFERRED EMBODIMENTS

The intermediates of this invention are prepared from 2-aminobenzenethiols as described in Example 1.

EXAMPLE 1

To a stirred slurry of 43.9 g. (0.3 mole) of S,S'-dimethyl cyanoimidodithiocarbonate [Hantzsch and Wolvenkamp, Ann. Chem. 321, 265 (1904)] in 600 ml. of ethyl alcohol, 75.2 g. (0.6 mole) of o-aminobenzenethiol is added in one portion at room temperature. After a few minutes a clear solution is obtained. The mixture is refluxed for five hours during which time a precipitate forms and methyl mercaptan and ammonia are liberated. After cooling to room temperature, the precipitate is recovered by filtration, washed with 100 ml. of heptane and air-dried at 25–30° C. 74 g. (87% yield) of 2,2'-iminobis(benzothiazole) is obtained which melts at 262–263° C. After recrystallization from dimethylformamide, the melting point remains unchanged. Analysis gives 14.70% N and 22.28% S compared to 14.83% N and 22.63% S calculated for $C_{14}H_9N_3S_2$. The product is insoluble in water, ether, acetone, chloroform, benzene, heptane, hexane and ethyl acetate and is soluble in dimethylformamide and dimethylsulfoxide. The pKa value of the product determined in a mixture of water and dimethylsulfoxide is $2.5 \times 10^{-10}$ which indicates that the substance is a weak acid.

Substituting 2-amino-5-chloro benzenethiol, 2-amino-4-chloro benzenethiol, 2-amino-4-nitro benzenethiol, 2-amino-5-hydroxy benzenethiol (4-amino-3-mercapto phenol), 2-amino-4-methyl benzenethiol (2-amino-p-toluenethiol), 2-amino-4-bromo benzenethiol (2-mercapto-5-bromo aniline) or 2-amino-5-ethoxy benzenethiol in the above procedure gives the corresponding 2,2'-iminobis(substituted-benzothiazole).

EXAMPLE 2

N,N - di(2 - benzothiazolyl)cyclohexyl, phenyl or cyclooctylsulfenamides.—To a stirred solution containing 28.3 g. (0.1 mole) of 2,2'-iminobis(benzothiazole) and 15 g. of triethylamine in 200 ml. of dimethylformamide, 0.1 mole of cyclohexyl, phenyl or cyclooctylsulfenyl chloride is added dropwise at 25–30° C. over a 30 minute period. The reaction mixture is stirred at 25–30° C. for 24 hours. After adding 1 kg. of ice water, the solid is collected by filtration and air-dried at 25–30° C. The data are summarized in Table I.

EXAMPLE 3

N,N - di(2 - benzothiazolyl)isopropylsulfenamide.—To a stirred solution containing 0.1 mole of isopropylsulfenyl chloride in 100 ml. of benzene, 0.1 mole of 2,2'-iminobis(benzothiazole) and 100 ml. of benzene is added in one portion. After stirring at 25–30° C. for 30 minutes, 10.3 g. (0.1 mole) of triethylamine in 50 ml. of benzene is added. The reaction mixture is stirred at 25–30° C. for 16 hours, heated at 56° C. for one hour and filtered hot. The benzene is removed in vacuo. The crude product, M.P. 142–146° C., is obtained in 67% yield. After recrystallization from isopropyl alcohol, it melts at 148–150° C. Analysis gives 57.36% C, 4.27% H, 11.51% N and 26.66% S compared to 57.10% C, 4.20% H, 11.82% N and 26.90% S calculated for $C_{17}H_{15}N_3S_3$.

The following tables illustrate the improved processing properties obtained by incorporating the new compounds into rubber. For all the rubber stocks tested, as illustrative of the invention, Mooney scorch times at 121° C. and 135° C. are determined by means of a Mooney plastomer. The time ($t_5$) in minutes required for the Mooney reading to rise five points above the minimum viscosity is recorded. Longer times on the Mooney Scorch test are indicative of greater processing safety. The cure characteristics of the stocks are determined by a Monsanto Oscillating Disk Rheometer at the indicated temperature. The time ($t_2$) in minutes required for a rise of two Rheometer units above the minimum reading and the time ($t_{90}$) required to obtain 90% of the Rheometer maximum torque are recorded. The difference ($t_{90} - t_2$) is indicative of the cure rate of the stock. Small values of $t_{90} - t_2$ indicate faster cure times. The vulcanization rate $K_2$ is measured in reciprocal minutes. See Coran, 37 Rubber Chemistry and Technology 689 (1964). Higher values of $K_2$ indicate higher rates of cross link formation. Vulcanizates are prepared by press curing the stocks at the indicated temperature for the time required to achieve optimum cure as determined from Rheometer data and the physical properties of the vulcanizates are measured and recorded.

The following natural rubber and styrene-butadiene rubber masterbatches are prepared to illustrate the properties of the compounds of this invention. All parts are by weight.

NATURAL RUBBER MASTERBATCH

| | |
|---|---|
| Smoked sheets | 100.0 |
| Zinc oxide | 3.0 |
| Stearic acid | 2.0 |
| Furnace carbon black | 45.0 |
| Hydrocarbon softener | 5.0 |
| Total | 155.0 |

SBR MASTERBATCH

| | |
|---|---|
| Oil-extended styrene-butadiene rubber | 137.5 |
| Zinc oxide | 3.0 |
| Stearic acid | 1.0 |
| Furnace carbon black | 65.0 |
| Hydrocarbon softener | 1.5 |
| Total | 208.0 |

Vulcanizable compositions are prepared by mixing sulfur and accelerator with the masterbatches. To some stocks, an antidegradant is also added. The properties of the stocks are determined as previously described and are shown in Tables II, III and IV.

TABLE I

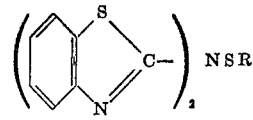

| R | M.P. | Empirical formula | Percent C Calculated | Percent C Found | Percent H Calculated | Percent H Found | Percent N Calculated | Percent N Found | Percent S Calculated | Percent S Found |
|---|---|---|---|---|---|---|---|---|---|---|
| Cyclohexyl | 137–139 | C₂₀H₁₉N₃S₃ | | | 4.82 | 4.75 | 10.57 | 10.34 | | |
| Phenyl | a 181–183 | C₂₀H₁₃N₃S₃ | 61.19 | 61.04 | 3.59 | 3.29 | 10.70 | 10.92 | 24.50 | 24.79 |
| Cyclooctyl | b 139–140 | C₂₂H₂₃N₃S₃ | | | 5.44 | 5.42 | 9.87 | 9.88 | 22.59 | 22.00 | a Recrystallization from heptane-benzene.
b Recrystallization from ethyl acetate.

TABLE II

| Stock Number | 1 | 2 | 3 | 4 | 5 | 6 | 7 | 8 | 9 | 10 |
|---|---|---|---|---|---|---|---|---|---|---|
| Natural rubber masterbatch | 155.0 | 155.0 | 155.0 | 155.0 | 155.0 | 155.0 | 155.0 | 155.0 | 155.0 | 155.0 |
| Sulfur | 2.2 | 2.2 | 2.2 | 2.2 | 2.2 | 2.2 | 2.2 | 2.2 | 2.2 | 2.2 |
| N-(1,3-dimethylbutyl)N'-phenyl-p-phenylenediamine | 2.0 | 2.0 | | | | | | | | |
| N-cyclohexyl-2-benzothiazolesulfenamide | 0.5 | 0.5 | | | | | | | | |
| N-tert-butyl-2-benzothiazolesulfenamide | | | 0.5 | 0.5 | | | | | | |
| N-diisopropyl-2-benzothiazolesulfenamide | | | | | 0.5 | 0.5 | | | | |
| 2-(2,6-dimethyl-4-morpholinothio)benzothiazole | | | | | | | 0.5 | 0.5 | | |
| Benzothiazyl disulfide | | | | | | | | | 0.5 | 0.5 |
| N,N-di(2-benzothiazolyl)benzenesulfenamide | | 0.5 | | 0.5 | | 0.5 | | 0.5 | | 0.5 |
| Mooney scorch at 121° C.: $t_5$, min | 18.6 | 21.2 | 32.4 | 39.4 | 36.6 | 50.0 | 36.3 | 45.1 | 18.0 | 20.7 |
| Rheometer at 144° C.: | | | | | | | | | | |
| $t_2$ | 5.1 | 5.5 | 7.4 | 9.6 | 7.8 | 11.1 | 7.6 | 10.0 | 5.4 | 6.5 |
| $t_{90}-t_2$ | 11.9 | 9.5 | 14.0 | 11.9 | 20.1 | 14.4 | 16.0 | 12.5 | 20.1 | 18.5 |
| $K_2$, min.⁻¹ | 0.21 | 0.24 | 0.19 | 0.24 | 0.145 | 0.19 | 0.17 | 0.22 | 0.11 | 0.13 |
| Stress-strain data cured at 144° C.: | | | | | | | | | | |
| Cure time, minutes | 30 | 25 | 30 | 30 | 40 | 35 | 35 | 30 | 40 | 40 |
| 300% modulus, p.s.i | 1,520 | 1,680 | 1,500 | 1,550 | 1,400 | 1,300 | 1,380 | 1,500 | 960 | 1,300 |
| Ultimate tensile strength, p.s.i | 3,500 | 3,650 | 3,700 | 3,800 | 3,280 | 3,500 | 3,600 | 3,700 | 2,350 | 3,300 |
| Ultimate elongation, percent | 500 | 500 | 550 | 550 | 520 | 550 | 570 | 550 | 570 | 550 |
| Shore "A" hardness | 59 | 60 | 53 | 58 | 55 | 60 | 54 | 57 | 50 | 55 |

TABLE III

| Stock Number | 1 | 2 | 3 | 4 | 5 | 6 | 7 |
|---|---|---|---|---|---|---|---|
| Natural rubber masterbatch | 155.0 | 155.0 | 155.0 | 155.0 | 155.0 | 155.0 | 155.0 |
| Sulfur | 2.2 | 2.2 | 2.2 | 2.2 | 2.2 | 2.2 | 2.2 |
| N-(1,3-dimethylbutyl)N'-phenyl-p-phenylenediamine | 2.0 | 2.0 | 2.0 | 2.0 | 2.0 | 2.0 | 2.0 |
| 2-(2,6-dimethyl-4-morpholinothio)benzothiazole | 0.5 | 0.5 | 0.5 | 0.5 | 0.5 | | |
| N-diisopropyl-2-benzothiazolesulfenamide | | | | | | 0.5 | 0.5 |
| N,N-di(2-benzothiazolyl)cyclohexylsulfenamide | | 1.0 | | | | | |
| N,N-di(2-benzothiazolyl)cyclooctylsulfenamide | | | 1.0 | | | | |
| N,N-di(2-benzothiazolyl)isopropylsulfenamide | | | | 0.5 | 1.0 | | 0.5 |
| Mooney scorch at 121° C.: $t_5$, min | 40.8 | | 45.3 | 46.5 | 46.8 | 38.6 | 52.2 |
| Rheometer at 144° C.: | | | | | | | |
| $t_2$ | 8.0 | 8.5 | 9.5 | 9.5 | 9.9 | 9.0 | 10.2 |
| $t_{90}-t_2$ | 14.5 | 9.5 | 9.8 | 10.0 | 10.1 | 15.0 | 10.3 |
| $K_2$, min.⁻¹ | 0.19 | 0.27 | 0.28 | 0.27 | 0.27 | 0.19 | 0.30 |
| Stress-strain data cured at 144° C.: | | | | | | | |
| Cure time, minutes | 35 | 30 | 30 | 30 | 30 | 35 | 30 |
| 300% modulus, p.s.i | 1,550 | 1,700 | 1,680 | 1,800 | 1,650 | 1,340 | 1,700 |
| Ultimate tensile strength, p.s.i | 3,400 | 3,710 | 3,850 | 3,800 | 3,800 | 3,350 | 3,750 |
| Ultimate elongation, percent | 510 | 510 | 530 | 520 | 520 | 520 | 520 |
| Shore "A" hardness | 60 | 62 | 60 | 61 | 61 | 61 | 61 |

TABLE IV

| | Stock Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| SBR masterbatch | 208.0 | 208.0 | 208.0 | 208.0 | 208.0 | 208.0 | 208.0 | 208.0 | 208.0 | 208.0 | 208.0 | 208.0 |
| Sulfur | 2.0 | 2.0 | 2.0 | 2.0 | 2.0 | 2.0 | 2.0 | 2.0 | 2.0 | 2.0 | 2.0 | 2.0 |
| N-(1,3-dimethylbutyl)N'-phenyl-p-phenylenediamine | 2.0 | 2.0 | 2.0 | 2.0 | 2.0 | 2.0 | | | 2.0 | 2.0 | 2.0 | 2.0 |
| 2-(2,6-dimethyl-4-morpholinothio)benzothiazole | 1.0 | 1.0 | 1.0 | 1.0 | | | | | | | | |
| 2-(morpholinothio)benzothiazole | | | | | 1.0 | 1.0 | 1.0 | 1.0 | | | | |
| 2-(morpholinodithio)benzothiazole | | | | | | | | | 1.0 | 1.0 | 1.0 | 1.0 |
| N,N-di(2-benzothiazolyl)cycloocytlsulfenamide | | 1.0 | | | | | | | | 0.6 | | |
| N,N-di(2-benzothiazolyl)isopropylsulfenamide | | | 0.5 | 1.0 | | 1.0 | | | | | 0.6 | |
| N,N-di(2-benzothiazolyl)benzenesulfenamide | | | | | | | | 0.5 | | | | 0.6 |
| Mooney scorch at 135° C.; $t_5$ min | 32.8 | 38.4 | 37.2 | 38.0 | 31.8 | 35.9 | 33.6 | 36.1 | 15.9 | 18.4 | 18.2 | 16.2 |
| Rheometer at 153° C.: | | | | | | | | | | | | |
| $t_2$ | 12.0 | 14.0 | 13.0 | 13.2 | 11.7 | 12.7 | 12.5 | 12.5 | 7.7 | 8.5 | 8.5 | 8.0 |
| $t_{90}-t_2$ | 20.2 | 17.4 | 17.5 | 17.2 | 19.3 | 16.5 | 21.7 | 19.0 | 17.8 | 15.0 | 15.0 | 14.5 |
| $K_2$, min.$^{-1}$ | 0.14 | 0.16 | 0.18 | 0.18 | 0.14 | 0.16 | | | | | | |
| Stress-strain data cured at 153° C.: | | | | | | | | | | | | |
| Cure time, minutes | 45 | 50 | 45 | 45 | 45 | 45 | 50 | 50 | 40 | 35 | 35 | 35 |
| 30% modulus, p.s.i. | 890 | 940 | 940 | 960 | 950 | 1,010 | 1,100 | 1,300 | 1,180 | 1,100 | 1,050 | 1,100 |
| Ultimate tensile strength, p.s.i. | 2,910 | 2,840 | 3,160 | 3,040 | 3,150 | 3,040 | 3,380 | 3,540 | 2,990 | 2,990 | 2,550 | 3,000 |
| Ultimate elongation, percent | 600 | 590 | 610 | 600 | 620 | 550 | 620 | 590 | 560 | 560 | 570 | 570 |
| Shore "A" hardness | 56 | 56 | 57 | 56 | 57 | 58 | 62 | 60 | 55 | 58 | 57 | 57 |

The data of Table II demonstrate the activity of an activator of this invention with different vulcanization accelerators. The odd number stocks are controls having accelerator alone whereas the even number stocks contain the delayed action activator. Note that the stocks containing the compound of this invention have improved processing safety as indicated by the improved Mooney scorch time and faster curing rates as indicated by the Rheometer data; and that these improvements are achieved without substantially changing the properties of the vulcanizates.

Table III demonstrates the activity of other compounds of the invention and Table IV demonstrates the applicability of the invention in synthetic rubber compositions.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for vulcanizing diene rubber compositions containing sulfur-vulcanizing agent and an accelerating agent selected from the group consisting of thiazole accelerators, dithio carbamate accelerators, thiuram sulfide accelerators, aldehyde-amine accelerators, diaryl guanidine accelerators and mixtures thereof which comprises adding an amount effective to enhance the vulcanization rate of the composition of the compound of the formula

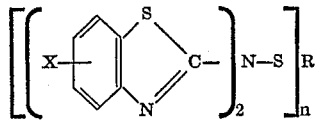

wherein X is hydrogen, lower alkyl, lower alkoxy, nitro, chloro, bromo, iodo or hydroxy and $n$ is one or two; when $n$ is one R is alkyl of 1–20 carbon atoms, cycloalkyl of 5–12 carbon atoms, aralkyl of 7–10 carbon atoms or aryl of 6–12 carbon atoms; when $n$ is two R is alkylene of 1–8 carbon atoms and heating at vulcanizing temperature.

2. A process of claim 1 wherein X is hydrogen.
3. A process of claim 2 wherein R is phenyl.
4. A process of claim 2 wherein R is cyclohexyl.
5. A process of claim 2 wherein R is isopropyl.
6. A vulcanizable composition comprising diene rubber sulfur-vulcanizing agent, an accelerating agent selected from the group consisting of thiazole accelerators, dithiocarbamate accelerators, thiuram sulfide accelerators, aldehyde-amine accelerators, diaryl guanidine accelerators and mixtures thereof and an amount effective to enhance the vulcanization rate of the composition of a compound of the formula

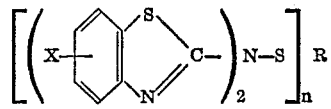

wherein X is hydrogen, lower alkyl, lower alkoxy, nitro, chloro, bromo, iodo or hydroxy and $n$ is one or two; when $n$ is one R is alkyl of 1–20 carbon atoms, cycloalkyl of 5–12 carbon atoms, aralkyl of 7–10 carbon atoms or aryl of 6–12 carbon atoms; when $n$ is two R is alkylene of 1–8 carbon atoms.

7. A composition of claim 6 wherein X is hydrogen.
8. A composition of claim 7 wherein R is phenyl.
9. A composition of claim 7 wherein R is cyclohexyl.
10. A composition of claim 7 wherein R is isopropyl.
11. A composition of claim 7 wherein R is cyclooctyl.

References Cited

UNITED STATES PATENTS 3,513,139   5/1970   Coran _____ 260—79.5 B

JOSEPH L. SCHOFER, Primary Examiner

C. A. HENDERSON, Jr., Assistant Examiner

U.S. Cl. X.R.

260—305, 780, 785, 788, 793, 796, 797